(12) United States Patent
Okano et al.

(10) Patent No.: US 11,081,253 B2
(45) Date of Patent: Aug. 3, 2021

(54) SILVER PARTICLE DISPERSING SOLUTION, METHOD FOR PRODUCING SAME, AND METHOD FOR PRODUCING CONDUCTIVE FILM USING SILVER PARTICLE DISPERSING SOLUTION

(71) Applicant: Dowa Electronics Materials Co., Ltd., Tokyo (JP)

(72) Inventors: Taku Okano, Tokyo (JP); Noriaki Nogami, Tokyo (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 16/347,974

(22) PCT Filed: Jun. 11, 2017

(86) PCT No.: PCT/JP2017/039867
§ 371 (c)(1),
(2) Date: May 7, 2019

(87) PCT Pub. No.: WO2018/088339
PCT Pub. Date: May 17, 2018

(65) Prior Publication Data
US 2019/0259510 A1    Aug. 22, 2019

(30) Foreign Application Priority Data

Nov. 8, 2016    (JP) .............................. JP2016-218262
Nov. 1, 2017    (JP) .............................. JP2017-212015

(51) Int. Cl.
| | | |
|---|---|---|
| H01B 1/22 | (2006.01) | |
| B22F 1/00 | (2006.01) | |
| C09D 11/322 | (2014.01) | |
| C09D 11/38 | (2014.01) | |
| C09D 11/52 | (2014.01) | |
| C09D 1/00 | (2006.01) | |
| H01B 13/00 | (2006.01) | |
| C09D 11/36 | (2014.01) | |
| B22F 1/02 | (2006.01) | |
| H01B 1/00 | (2006.01) | |
| C09C 1/62 | (2006.01) | |
| C09D 5/24 | (2006.01) | |
| B22F 9/00 | (2006.01) | |
| C09C 3/08 | (2006.01) | |

(52) U.S. Cl.
CPC ................. H01B 1/22 (2013.01); B22F 1/00 (2013.01); B22F 1/0022 (2013.01); B22F 1/0062 (2013.01); B22F 1/0088 (2013.01); B22F 1/02 (2013.01); B22F 9/00 (2013.01); C09C 1/62 (2013.01); C09C 3/08 (2013.01); C09D 1/00 (2013.01); C09D 5/24 (2013.01); C09D 11/322 (2013.01); C09D 11/36 (2013.01); C09D 11/38 (2013.01); C09D 11/52 (2013.01); H01B 1/00 (2013.01); H01B 13/00 (2013.01); *B22F 2001/0092* (2013.01); *B22F 2301/255* (2013.01); *B22F 2304/056* (2013.01); *B22F 2304/058* (2013.01)

(58) Field of Classification Search
CPC . H01B 1/22; C09D 1/00; B22F 1/0062; B22F 2301/255; C09C 1/62
USPC .................................................. 252/514, 512
See application file for complete search history.

(56) References Cited

U.S. PATENT DOCUMENTS

| | | | | |
|---|---|---|---|---|
| 2009/0236404 | A1* | 9/2009 | Yamakawa | H05K 1/097 228/123.1 |
| 2009/0293766 | A1* | 12/2009 | Kamikoriyama | H01B 1/22 106/31.92 |
| 2012/0070570 | A1* | 3/2012 | Kim | H01B 1/02 427/192 |
| 2015/0115018 | A1* | 4/2015 | Hori | B23K 31/12 228/104 |
| 2015/0225588 | A1* | 8/2015 | Iguchi | H01B 1/22 106/31.92 |
| 2016/0001361 | A1* | 1/2016 | Terao | C22C 5/06 252/514 |

(Continued)

FOREIGN PATENT DOCUMENTS

| | | | | |
|---|---|---|---|---|
| JP | 2005093380 A | * | 4/2005 | ............. B82Y 30/00 |
| JP | 2005093389 A | | 4/2005 | |

(Continued)

OTHER PUBLICATIONS

International search report for patent application No. PCT/JP2017/039867 dated Nov. 21, 2017.

*Primary Examiner* — Tri V Nguyen
(74) *Attorney, Agent, or Firm* — Bachman and Lapointe PC; George Coury

(57) ABSTRACT

There is provided an inexpensive silver particle dispersing solution being usable as a slurry for ink jet, a method for producing the same, and a method for producing a conductive film using the silver particle dispersing solution. In a silver particle dispersing solution containing a silver powder and a solvent, the silver powder has an average primary particle diameter ($D_{SEM}$) of 0.15 to 0.5 μm, and the ratio ($D_{50}/D_{SEM}$) of a particle diameter ($D_{50}$), which corresponds to 50% of accumulation in volume-based cumulative distribution of the silver powder, to the average primary particle diameter ($D_{SEM}$) is not less than 1.7, the silver powder having a fatty acid adhered to the surface thereof, and the solvent containing a monohydric higher alcohol having a carbon number of 6 to 12, butyl carbitol or butyl carbitol acetate as the main component thereof.

8 Claims, No Drawings

(56) References Cited

U.S. PATENT DOCUMENTS

2016/0041649 A1* 2/2016 Uchida ................ H05K 3/1216
345/174

FOREIGN PATENT DOCUMENTS

| JP | 2005229109 A | | 8/2005 | |
|----|--------------|---|--------|------------------|
| JP | 2009021502 A | * | 1/2009 | ....... H01L 27/10894 |
| WO | 2016052362 A1 | | 4/2016 | |

* cited by examiner

SILVER PARTICLE DISPERSING SOLUTION, METHOD FOR PRODUCING SAME, AND METHOD FOR PRODUCING CONDUCTIVE FILM USING SILVER PARTICLE DISPERSING SOLUTION

TECHNICAL FIELD

The present invention relates generally to a silver particle dispersing solution, a method for producing the same, and a method for producing a conductive film using the silver particle dispersing solution. More specifically, the invention relates to a silver particle dispersing solution which contains silver particles dispersed in a solvent, a method for producing the same, and a method for producing a conductive film using the silver particle dispersing solution.

BACKGROUND ART

As a conventional method for forming conductive films, such as electrodes and circuits of electronic parts, there is known a method for applying a silver particle dispersing solution, which has silver particles serving as fillers dispersed in a solvent, on a substrate to heat the solvent or to irradiate the solution with light, to cure the solution to form a conductive film.

If a conventional silver particle dispersing solution is used as a slurry for ink-jet, it is required that silver particles having a size which is approximate to that of the primary particles thereof as near as possible, are dispersed in a solvent. It is also required to use a solvent in which silver particles are easily dispersed. Moreover, it is required that the dispersed state of silver particles in a solvent is held so that it is difficult to allow the silver particles to be precipitated, even if the silver particle dispersing solution is allowed to stand for a long period of time.

As such a silver particle dispersing solution, there is proposed a silver ink wherein a silver powder having an average primary particle size $D_{IA}$ of not greater than 0.6 µm, which is obtained by analyzing an image obtained by means of a scanning electron microscope, is dispersed in a solvent of a polyol or the like (see, e.g., Patent Document 1). There is also proposed a composition which contains a functional material such as a silver powder, an organic polymer and a dispersing vehicle (see, e.g., Patent Document 2).

PRIOR ART DOCUMENT(S)

Patent Document(s)

Patent Document 1: Japanese Patent Laid-Open No. 2005-93389 (Paragraph Number 0013)
Patent Document 2: Japanese Patent Laid-Open No. 2005-229109 (Paragraph Numbers 0010-0021)

SUMMARY OF THE INVENTION

Problem to be Solved by the Invention

However, in the silver ink proposed in Patent Document 1, it is required to use a silver powder having a cohesion of not greater than 1.5, the cohesion being expressed by a ratio $D_{50}/D_{IA}$ of an average particle diameter $D_{50}$, which is obtained by the laser diffraction scattering particle size analyzing method, to an average primary particle diameter $D_{IA}$ which is obtained by analyzing an image obtained by means of a scanning electron microscope. Such a silver powder having a low cohesion is expensive, so that the production costs thereof are increased. The composition of Patent Document 2 uses an expensive organic polymer or the like, so that the production costs thereof are increased.

It is therefore an object of the present invention to eliminate the aforementioned conventional problems and to provide an inexpensive silver particle dispersing solution being usable as a slurry for ink-jet, a method for producing the same, and a method for producing a conductive film using the silver particle dispersing solution.

Means for Solving the Problem

In order to accomplish the aforementioned object, the inventors have diligently studied and found that it is possible to produce an inexpensive silver particle dispersing solution which can be used as a slurry for ink-jet to produce a conductive film, if the silver particle dispersing solution comprises a silver powder and a solvent, wherein the silver powder has an average primary particle diameter ($D_{SEM}$) of 0.15 to 0.5 µm, wherein the ratio ($D_{50}/D_{SEM}$) of a particle diameter ($D_{50}$), which corresponds to 50% of accumulation in volume-based cumulative distribution of the silver powder, to the average primary particle diameter ($D_{SEM}$) is not less than 1.7, and wherein the main component of the solvent is an organic compound having a carbon number of 6 to 20. Thus, the inventors have made the present invention.

According to the present invention, there is provided a silver particle dispersing solution comprising: a silver powder; and a solvent, wherein the silver powder has an average primary particle diameter ($D_{SEM}$) of 0.15 to 0.5 µm, wherein the ratio ($D_{50}/D_{SEM}$) of a particle diameter ($D_{50}$), which corresponds to 50% of accumulation in volume-based cumulative distribution of the silver powder, to the average primary particle diameter ($D_{SEM}$) is not less than 1.7, and wherein the main component of the solvent is an organic compound having a carbon number of 6 to 20.

In the silver particle dispersing solution, the solvent is preferably an organic solvent which freezes at a temperature of −80° C. to −20° C., and the organic solvent having the carbon number of 6 to 20 is preferably a monohydric higher alcohol having a carbon number of 6 to 12, butyl carbitol or butyl carbitol acetate. If the organic compound having the carbon number of 6 to 20 is the monohydric higher alcohol having the carbon number of 6 to 12, the solvent may contain a lower alcohol or ketone, which have a carbon number of not larger than 5, as a viscosity modifier. The monohydric higher alcohol having the carbon number of 6 to 12 is preferably dodecanol. To the surface of the silver powder, a fatty acid is preferably adhered. The fatty acid preferably has a hydroxyl group. The fatty acid having the hydroxyl group is preferably ricinoleic acid. The silver particle dispersing solution preferably contains a dispersing agent. The content of the silver powder in the silver particle dispersing solution is preferably 10 to 45% by weight.

According to the present invention, there is provided a method for producing a silver particle dispersing solution, the method comprising the steps of: preparing a silver powder which has an average primary particle diameter ($D_{SEM}$) of 0.15 to 0.5 µm and wherein the ratio ($D_{50}/D_{SEM}$) of a particle diameter ($D_{50}$), which corresponds to 50% of accumulation in volume-based cumulative distribution of the silver powder, to the average primary particle diameter ($D_{SEM}$) is not less than 1.7; and mixing the silver powder with a solvent which contains an organic compound having a carbon number of 6 to 20 as a main component thereof.

In this method for producing a silver particle dispersing solution, the solvent is preferably an organic solvent which freezes at a temperature of −80° C. to −20° C. The organic solvent having the carbon number of 6 to 20 is preferably a monohydric higher alcohol having a carbon number of 6 to 12, butyl carbitol or butyl carbitol acetate. If the organic compound having the carbon number of 6 to 20 is the monohydric higher alcohol having the carbon number of 6 to 12, the solvent preferably contains a lower alcohol or ketone, which have a carbon number of not larger than 5, as a viscosity modifier. The monohydric higher alcohol having the carbon number of 6 to 12 is preferably dodecanol. To the surface of the silver power, a fatty acid is preferably adhered. The fatty acid preferably has a hydroxyl group. The fatty acid having the hydroxyl group is preferably ricinoleic acid. When the silver powder is mixed with the solvent, a dispersing agent is preferably mixed therewith. The content of the silver powder in the silver particle dispersing solution is preferably 10 to 45% by weight. The slurry obtained by mixing the silver powder with the solvent is caused to pass through a filter having a mesh of 0.1 to 2 μm by applying pressure thereto while applying ultrasonic waves thereto.

According to the present invention, there is provided a method for producing a conductive film comprising the steps of: preparing the above-described silver particle dispersing solution; applying the silver particle dispersing solution on a substrate by means of an ink-jet printer; and curing the silver particle dispersing solution. This method for producing a conductive film may further comprise the steps of: freezing the prepared silver particle dispersing solution to be preserved; defrosting the frozen silver particle dispersing solution; and applying the defrosted silver particle dispersing solution on the substrate by the ink-jet printer.

Effects of the Invention

According to the present invention, it is possible to provide an inexpensive silver particle dispersing solution being usable as a slurry for ink-jet, a method for producing the same, and a method for producing a conductive film using the silver particle dispersing solution

MODE FOR CARRYING OUT THE INVENTION

The preferred embodiment of a silver particle dispersing solution according to the present invention comprises a silver powder and a solvent, wherein the silver powder has an average primary particle diameter ($D_{SEM}$) of 0.15 to 0.5 μm, wherein the ratio ($D_{50}/D_{SEM}$) of a particle diameter ($D_{50}$), which corresponds to 50% of accumulation in volume-based cumulative distribution of the silver powder, to the average primary particle diameter ($D_{SEM}$) is not less than 1.7, and wherein the main component (component of not less than 50% by weight) of the solvent is an organic compound having a carbon number of 6 to 20.

In the silver particle dispersing solution, the average primary particle diameter ($D_{SEM}$) of the silver powder is 0.15 to 0.5 μm, and the ratio ($D_{50}/D_{SEM}$) of the particle diameter ($D_{50}$), which corresponds to 50% of accumulation in volume-based cumulative distribution of the silver powder, to the average primary particle diameter ($D_{SEM}$) is not less than 1.7 (preferably 2 to 3). If the average primary particle diameter ($D_{SEM}$) of the silver powder is less than 0.15 μm, the production costs of the silver powder are increased. If the average primary particle diameter ($D_{SEM}$) of the silver powder is larger than 0.5 μm, when the silver particle dispersing solution is used as a slurry for ink-jet, the dischargability of the slurry from an ink-jet printer is deteriorated. If the ratio ($D_{50}/D_{SEM}$) (cohesion) of the particle diameter ($D_{50}$), which corresponds to 50% of accumulation in volume-based cumulative distribution of the silver powder, to the average primary particle diameter ($D_{SEM}$) is less than 2, the production costs of the silver powder are increased. It is generally considered that the cohesion ($D_{50}/D_{SEM}$) of the silver powder used in a slurry for ink-jet is preferably small. However, if the slurry for ink-jet can be satisfactorily printed without the cohesion of the silver powder immediately before the slurry is discharged from a nozzle of an ink-jet printer after it is supplied to the nozzle, the cohesive force for cohering silver particles to each other is preferably high after printing. Therefore, in the preferred embodiment of a silver particle dispersing solution according to the present invention, the silver powder having the cohesion of not less than 1.7 is mixed with a particular solvent for providing an inexpensive silver particle dispersing solution which is usable as a slurry for ink-jet.

The solvent is preferably an organic solvent which freezes at a temperature of −80° C. to −20° C. (preferably −50° C. to 0° C.) (an organic solvent having a freezing point of −80° C. to −20° C. (preferably −50° C. to 0° C.)). The organic solvent having the carbon number of 6 to 20 is preferably a monohydric higher alcohol having a carbon number of 6 to 12, butyl carbitol (BC) or butyl carbitol acetate (BCA). If the organic compound having the carbon number of 6 to 20 is a monohydric higher alcohol having a carbon number of 6 to 12, the solvent may contain a suitable amount of a lower alcohol such as isopropyl alcohol (IPA), or a ketone, which have a carbon number of not larger than 5, as a viscosity modifier. If the solvent contains a suitable amount of such a viscosity modifier, when the silver particle dispersing solution is used as a slurry for ink-jet, it is possible to improve the dischargability of the slurry from an ink-jet printer, and it is possible to improve the long-term preservability (particularly the long-term preservability by freezing) as the slurry for ink-jet. The monohydric higher alcohol having the carbon number of 6 to 12 is preferably a monohydric alcohol which is liquid at room temperature, and more preferably dodecanol.

To the surface of the silver powder, a fatty acid having a carbon number of 18 (such as ricinoleic acid, oleic acid and stearic acid), or a fatty acid having a carbon number of 6 to 16 (such as palmitic acid and octanoic acid) is preferably adhered. The fatty acid is more preferably a hydrophilic fatty acid (such as ricinoleic acid, 12-hydroxystearic acid or aleuritic acid), which has at least one carboxyl group and at least one hydroxyl group in its molecule. If the hydrophilic fatty acid is adhered to the surface of the silver powder, it is considered that the dispersability of the silver powder in a solvent of an alcohol having a hydroxyl group is improved, so that it is difficult to allow silver particles to be precipitated.

The silver particle dispersing solution preferably contain a dispersing agent. The dispersing agent can be suitably chosen in accordance with the kind of the solvent and the kind of the fatty acid adhered to the surface of the silver powder. As the dispersing agent, there may be used a fatty acid such as oleic acid, an aliphatic amine such as polyethylene imine, a polyacrylic acid or the like. As a commercially-available dispersing agent, for example, there may be used PLYSURF (registered trademark) such as PLYSURF A212C produced by DKS Co., Ltd., Disper BYK (registered trademark) or Disper BYK (registered trademark) such as Disper BYK-111 produced by BYK-Chemie Japan Co., Ltd., MEGAFAC (registered trademark) produced by DIC Corporation, AJISPAR (registered trademark) produced by Ajinomoto Fine-Techno Co., Inc., Hypermer (registered trademark) produced by CRODA Corporation, SOLSPARSE (registered trademark) or SOLPLUS (registered trademark) produced by Lubrizol Japan Co., Ltd., SN SPARSE produced by SAN NOPCO LIMITED, FTERGENT (registered trademark) produced by NEOS Co., Ltd., View Light (registered trademark) produced by Sanyo Chemical Industries, Ltd., KAOCERA (registered trademark) produced by Kao Corporation, or the like. If such a dispersing agent is added to the silver particle dispersing solution, it is possible to improve the dispersability of the silver powder in the solvent, so that it is possible to improve the long-term preservability of the silver particle dispersing solution.

The content of the silver powder in the silver particle dispersing solution is preferably 10 to 45% by weight. If the content of the silver powder is less than 10% by weight, when the silver particle dispersing solution is used as a slurry for ink-jet, the electric conductivity of a conductive film, which is formed by curing the silver particle dispersing solution after applying the solution on a substrate by means of an ink-jet printer, is insufficient. On the other hand, if the content of the silver powder exceeds 45% by weight, when the silver particle dispersing solution is used as a slurry for ink-jet, the dischargability of the slurry from an ink-jet printer is deteriorated. Furthermore, as a silver particle dispersing solution which contains silver particles serving as fillers dispersed in a solvent, there is a conductive paste which contains silver particles having a high concentration of not less than 50% by weight, a solvent, a resin and other components and which has a high viscosity of about a few Pa·s. However, the preferred embodiment of a silver particle dispersing solution according to the present invention comprises a silver powder and a solvent wherein the silver particle has a low concentration of not higher than 45% by weight. For that reason, the silver particle dispersing solution has a low viscosity of about a few mPa·s (for example, a viscosity of 2 to 30 mPa·s at 25° C.), so that it is a liquid which is usable as a slurry for ink-jet.

The above-described preferred embodiment of a silver particle dispersing solution according to the present invention can be produced by the preferred embodiment of a method for producing a silver particle dispersing solution according to the present invention. In the preferred embodiment of a method for producing a silver particle dispersing solution according to the present invention, a silver powder, which has an average primary particle diameter ($D_{SEM}$) of 0.15 to 0.5 μm and wherein the ratio ($D_{50}/D_{SEM}$) of a particle diameter ($D_{50}$), which corresponds to 50% of accumulation in volume-based cumulative distribution of the silver powder, to the average primary particle diameter ($D_{SEM}$) is not less than 1.7 (preferably 2 to 3), is mixed with a solvent which contains an organic compound having a carbon number of 6 to 20 as a main component thereof.

In this method for producing a silver particle dispersing solution, the solvent is preferably an organic solvent which freezes at a temperature of −80° C. to −20° C. (preferably −50° C. to 0° C.). The organic solvent having the carbon number of 6 to 20 is preferably a monohydric higher alcohol having a carbon number of 6 to 12, butyl carbitol (BC) or butyl carbitol acetate (BCA). If the organic compound having the carbon number of 6 to 20 is the monohydric higher alcohol having the carbon number of 6 to 12, the solvent may contain a suitable amount of a lower alcohol such as isopropyl alcohol (IPA), or a ketone such as acetone, which have a carbon number of not larger than 5, as a viscosity modifier. If the solvent contains a suitable amount of such a viscosity modifier, when the silver particle dispersing solution is used as a slurry for ink-jet, it is possible to improve the dischargability of the slurry from an ink-jet printer, and it is possible to improve the long-term preservability (particularly the long-term preservability by freezing) as the slurry for ink-jet. The monohydric higher alcohol having the carbon number of 6 to 12 is preferably a monohydric alcohol which is liquid at room temperature, and more preferably dodecanol.

To the surface of the silver powder, a fatty acid having a carbon number of 18 (such as ricinoleic acid, oleic acid and stearic acid), or a fatty acid having a carbon number of 6 to 16 (such as palmitic acid and octanoic acid) is preferably adhered. The fatty acid is more preferably a hydrophilic fatty acid (such as ricinoleic acid, 12-hydroxystearic acid or aleuritic acid), which has at least one carboxyl group and at least one hydroxyl group in its molecule. The amount of the fatty acid to be adhered to the surface of the silver powder is 0.05 to 1.0% by weight with respect to silver. Furthermore, as usual methods for identifying the fatty acid adhered to the surface of the silver powder, there are a method for measuring the amount of the fatty acid by means of a Fourier-transform infrared (FT-IR) spectrophotometer, a method for solvent-extracting a surface treating agent to measure the amount of the fatty acid by means of a carbon automatic analyzer or gas chromatography-mass spectrometry (GC-MS), a method for measuring the amount of the fatty acid, which is released from the surface of the silver powder by heating by means of a pyrolyzer or the like, by means of a carbon automatic analyzer or gas chromatography-mass spectrometry (GC-MS), and so forth. However, since a fatty acid having a hydroxyl group, such as ricinoleic acid, has a high polarity, the sensitivity of measurement in these methods is very low. However, if the functional group of the fatty acid is methylated, it is possible to identify ricinoleic acid adhered to the surface of silver. For example, 1 mL of a mixed solution of hydrochloric acid and methanol (hydrochloric acid-methanol reagent produced by Tokyo Chemical Industry Co., Ltd.) is added to 0.5 g of a silver powder to be heated at 50° C. for 30 minutes to release organic substances from the surface of the silver powder to methylate the functional groups of the organic substances, and then, allowed to cool. Then, 1 mL of pure water and 2 mL of n-hexane are added thereto to be shaken to extract the methylated organic substances into the phase of hexane which is component-analyzed by means of a gas chromatography-mass spectrometer (GC-MS). Thus, the organic substances on the surface of the silver powder can be identified.

When the silver powder is mixed with the solvent, a dispersing agent (e.g., PLYSURF A212C) is preferably mixed therewith. The content of the silver powder in the silver particle dispersing solution is preferably 10 to 45% by weight. The slurry obtained by mixing the silver powder to the solvent may be caused to pass through a filter having a mesh of 0.1 to 2 μm by applying pressure thereto while applying ultrasonic waves thereto.

The above-described silver particle dispersing solution can be applied on a substrate by means of an ink-jet printer to be cured to form a conductive film. In this case, after the silver particle dispersing solution is frozen to be preserved, the solution may be defrosted to be applied on a substrate by means of an ink-jet printer.

Furthermore, the solvent in the silver particle dispersing solution is extracted with acetone or ethanol, and a gas chromatography-mass spectrometry (GC-MS) is used for raising the temperature of the extract at a rate of 10 to 20° C./min. in a current of He gas to pour the volatile component thereof into a capillary column to measure the molecular weight of the component. If the measured molecular weight is compared with data in library, it is possible to identify the kind of the solvent in the silver particle dispersing solution.

EXAMPLES

The examples of a silver particle dispersing solution, a method for producing the same, and a method for producing a conductive film using the silver particle dispersing solution according to the present invention will be described below in detail.

Example 1

There was prepared a silver powder (AG2-109 produced by DOWA ELECTRONICS MATERIALS CO., LTD.), to the surface of which ricinoleic acid was adhered as a fatty acid. The prepared silver powder was observed at a magnification of 20,000 by means of a scanning electron microscope (SEM) (JSM-6100 produced by Japan Electronic Industry Co., Ltd.). With respect to 500 or more of silver particles selected at random from those on the SEM image of the silver powder, the average primary particle diameter ($D_{SEM}$) (based on the SEM image) of the silver particles was calculated by means of an image analyzing software (Smile View produced by Japan Electronic Industry Co., Ltd.). As a result, the average primary particle diameter ($D_{SEM}$) was 0.21 µm.

With respect to a sample obtained by dispersing 0.1 g of the above-described silver powder, which was added to 40 mL of isopropyl alcohol, for 2 minutes by means of an ultrasonic homogenizer having a chip diameter of 20 mm, the volume-based cumulative distribution of the silver powder was obtained in the total flection mode by means of a laser diffraction scattering particle size analyzer (MICROTRAC MT3300EXII produced by Microtrac BEL Corporation). As a result, the particle diameter ($D_{10}$) corresponding to 10% of accumulation in volume-based cumulative distribution was 0.18 µm, and the particle diameter ($D_{50}$) corresponding to 50% of accumulation in volume-based cumulative distribution was 0.57 µm. The particle diameter ($D_{90}$) corresponding to 90% of accumulation in volume-based cumulative distribution was 1.12 µm, and the particle diameter ($D_{100}$) corresponding to 100% of accumulation in volume-based cumulative distribution was 3.27 µm, so that the cohesion $D_{50}/D_{SEM}$ was 2.70.

There was obtained a slurry by adding 120 g (29.8% by weight) of the above-described silver powder and 2.4 g (0.6% by weight) of a dispersing agent (PLYSURF A212C produced by DKS Co., Ltd.) to 280 g (69.6% by weight) of a solvent of dodecanol and isopropyl alcohol (IPA) (dodecanol (% by weight):IPA (% by weight)=9:1). The slurry was caused to pass through a filter having a mesh of 1 µm by applying a pressure of 0.05 MPa thereto while applying ultrasonic waves thereto at an ultrasonic wave output of 100 W by means of an ultrasonic dispersion filtering device (FUS-1 type produced by NIHONSEIKI KAISHA LTD.). Thus, a silver particle dispersing solution containing dispersed silver particles was obtained.

The viscosity of the silver particle dispersing solution thus obtained was measured at a shear velocity of 100 (1/s) by means of a rheometer (MARS60 produced by Thermo Fisher Scientific K.K.). As a result, the viscosity of the silver particle dispersing solution was 12.4 mPa·s.

The surface tension of the silver particle dispersing solution was measured at 25° C., by means of a lift-type surface tensiometer (DY-200 produced by Kyowa Interface Science Co., Ltd.). As a result, the surface tension was 26 mN/m.

By the same methods as the above-described methods, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.19 µm. The particle diameter ($D_{10}$) corresponding to 10% of accumulation in volume-based cumulative distribution was 0.19 µm, and the particle diameter ($D_{50}$) corresponding to 50% of accumulation in volume-based cumulative distribution was 0.50 µm. The particle diameter ($D_{90}$) corresponding to 90% of accumulation in volume-based cumulative distribution was 0.97 µm, and the particle diameter ($D_{100}$) corresponding to 100% of accumulation in volume-based cumulative distribution was 1.95 µm. The cohesion $D_{50}/D_{SEM}$ was 2.62. The cohesion $D_{50}/D_{SEM}$ of this silver particle dispersing solution was decreased by 0.08 in comparison with the cohesion $D_{50}/D_{SEM}$ (2.70) of the above-described silver particles before kneading.

In order to evaluate the dischargability (initial dischargability) of the silver particle dispersing solution, an ink-jet printer (Material Printer DMP-2831 produced by Dimatix, Inc.) was used for discharging the silver particle discharging solution serving as a slurry for ink-jet at a drive voltage of 35 V and a cartridge temperature of 45° C., and the state of discharge of the silver particle discharging solution was confirmed by means of a printer control software (Drop Watcher attached to Material Printer control software Dimatix Drop Manager produced by Dimatix, Inc.). As a result, it was confirmed that the silver particle dispersing solution was linearly discharged without the stoppage thereof.

After 2 mL of the silver particle dispersing solution was dropped into a precipitation tube, it was preserved at room temperature for three days, and the precipitatability (precipitation after 3 days at room temperature) thereof was confirmed. As a result, it was confirmed that a very small amount of silver particles were precipitated. By the same method as the above-described method, there was confirmed the dischargability of the silver particle dispersing solution after it was preserved at room temperature for three days (dischargability after 3 days at room temperature). As a result, it was confirmed that the silver particle dispersing solution was linearly discharged without the stoppage thereof.

After 2 mL of the silver particle dispersing solution was dropped into a precipitation tube, it was allowed to stand at −50° C. in a freezer (Super Freezer DFM-705 produced by DAIREI Co., Ltd.) to be freeze-preserved for three days, and thereafter, dipped in water (room temperature) in a water tank of an ultrasonic wave disperser to be defrosted by applying ultrasonic vibrations thereto. Then, the precipitatability (precipitation after freezing for 3 days) of the defrosted solution was confirmed. As a result, it was confirmed that silver particles were not precipitated. By the same method as the above-described method, there was confirmed the dischargability of the silver particle dispersing solution after it was freeze-preserved for three days (dischargability after freezing for 3 days). As a result, it was confirmed that the silver particle dispersing solution was linearly discharged without the stoppage thereof.

The obtained silver particle dispersing solution was used for printing a line having a width of 100 µm and a length of 20 mm on a glossy paper for ink-jet by means of an ink-jet printer (Material Printer DMP-2831 produced by Dimatix, Inc.), and then, heated at 120° C. for 30 minutes to be cured to obtain a conductive film. With respect to the conductive film thus obtained, a microscope (Digital Microscope VHK-5000 produced by KEYENCE CORPORATION) was used for measuring the line width of the conductive film, and a laser microscope (Laser Microscope VK-9710 produced by KEYENCE CORPORATION) was used for measuring the thickness of the conductive film. In addition, a digital multi-meter (Digital Multi-Meter R6551 produced by Advantest Corporation) was used for measuring the resistance of the conductive film by causing terminals to contact both ends of the linear conductive film, and the specific resistance of the conductive film was calculated. As a result, the specific resistance was 50 µΩ·cm which was a practical resistance value.

Example 2

There was prepared a silver powder (AG2-98 produced by DOWA ELECTRONICS MATERIALS CO., LTD.), to the surface of which ricinoleic acid was adhered as a fatty acid. The average primary particle diameter ($D_{SEM}$) (based on the SEM image) of the silver particles was calculated by the same method as that in Example 1. As a result, the average primary particle diameter ($D_{SEM}$) was 0.21 µm. The volume-based cumulative distribution of the silver powder was obtained by the same method as that in Example 1. As a result, the particle diameter ($D_{10}$) corresponding to 10% of accumulation in volume-based cumulative distribution was 0.18 µm, and the particle diameter ($D_{50}$) corresponding to 50% of accumulation in volume-based cumulative distribution was 0.59 µm. The particle diameter ($D_{90}$) corresponding to 90% of accumulation in volume-based cumulative distribution was 1.22 µm, and the particle diameter ($D_{100}$) corresponding to 100% of accumulation in volume-based cumulative distribution was 3.89 µm, so that the cohesion $D_{50}/D_{SEM}$ was 2.79.

There was obtained a slurry by adding 120 g (29.8% by weight) of the above-described silver powder and 2.4 g (0.6% by weight) of a dispersing agent (PLYSURF A212C produced by DKS Co., Ltd.) to 280 g (69.6% by weight) of a solvent of dodecanol and isopropyl alcohol (IPA) (dodecanol (% by weight):IPA (% by weight)=9:1). The slurry was caused to pass through a filter having a mesh of 0.6 µm by applying a pressure of 0.05 MPa thereto while applying ultrasonic waves thereto at an ultrasonic wave output of 100 W by means of an ultrasonic dispersion filtering device (FUS-1 type produced by NIHONSEIKI KAISHA LTD.). Thus, a silver particle dispersing solution containing dispersed silver particles was obtained.

The surface tension of the silver particle dispersing solution thus obtained was measured by the same method as that in Example 1. As a result, the surface tension was 26.7 mN/m.

By the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.20 µm. The particle diameter ($D_{10}$) corresponding to 10% of accumulation in volume-based cumulative distribution was 0.25 µm, and the particle diameter ($D_{50}$) corresponding to 50% of accumulation in volume-based cumulative distribution was 0.68 µm. The particle diameter ($D_{90}$) corresponding to 90% of accumulation in volume-based cumulative distribution was 1.25 µm, and the particle diameter ($D_{100}$) corresponding to 100% of accumulation in volume-based cumulative distribution was 2.75 µm. The cohesion $D_{50}/D_{SEM}$ was 3.38. The cohesion $D_{50}/D_{SEM}$ of this silver particle dispersing solution was increased by 0.59 in comparison with the cohesion $D_{50}/D_{SEM}$ (2.79) of the above-described silver particles before kneading.

The initial dischargability of the silver particle dispersing solution was confirmed by the same method as that in Example 1. As a result, it was confirmed that the silver particle dispersing solution was linearly discharged without the stoppage thereof. The precipitation after 3 days at room temperature and the dischargability after 3 days at room temperature were confirmed by the same methods as those in Example 1. As a result, it was confirmed that a very small amount of silver particles were precipitated and that the silver particle dispersing solution was linearly discharged without the stoppage thereof when it was discharged. Moreover, the precipitation after freezing for 3 days and the dischargability after freezing for 3 days were confirmed by the same methods as those in Example 1. As a result, it was confirmed that silver particles were not precipitated, and it was confirmed that the silver particle dispersing solution was linearly discharged without the stoppage thereof when it was discharged.

Example 3

There was prepared a silver powder (AG2-1C produced by DOWA ELECTRONICS MATERIALS CO., LTD.), to the surface of which oleinic acid was adhered as a fatty acid. The average primary particle diameter (DSEM) (based on the SEM image) of the silver particles was calculated by the same method as that in Example 1. As a result, the average primary particle diameter (DSEM) was 0.26 µm. The volume-based cumulative distribution of the silver powder was obtained by the same method as that in Example 1. As a result, the particle diameter ($D_{10}$) corresponding to 10% of accumulation in volume-based cumulative distribution was 0.21 µm, and the particle diameter ($D_{50}$) corresponding to 50% of accumulation in volume-based cumulative distribution was 0.58 µm. The particle diameter ($D_{90}$) corresponding to 90% of accumulation in volume-based cumulative distribution was 1.10 µm, and the particle diameter ($D_{100}$) corresponding to 100% of accumulation in volume-based cumulative distribution was 3.27 µm, so that the cohesion $D_{50}/D_{SEM}$ was 2.23.

There was obtained a slurry by adding 120 g (29.8% by weight) of the above-described silver powder and 2.4 g (0.6% by weight) of a dispersing agent (PLYSURF A212C produced by DKS Co., Ltd.) to 280 g (69.6% by weight) of a solvent of dodecanol and isopropyl alcohol (IPA) (dodecanol (% by weight):IPA (% by weight)=9:1). The slurry was caused to pass through a filter having a mesh of 1 µm by applying a pressure of 0.05 MPa thereto while applying ultrasonic waves thereto at an ultrasonic wave output of 100 W by means of an ultrasonic dispersion filtering device (FUS-1 type produced by NIHONSEIKI KAISHA LTD.). Thus, a silver particle dispersing solution containing dispersed silver particles was obtained.

The surface tension of the silver particle dispersing solution thus obtained was measured by the same method as that in Example 1. As a result, the surface tension was 27.7 mN/m.

By the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.26 μm. The particle diameter ($D_{10}$) corresponding to 10% of accumulation in volume-based cumulative distribution was 0.35 μm, and the particle diameter ($D_{50}$) corresponding to 50% of accumulation in volume-based cumulative distribution was 0.86 μm. The particle diameter ($D_{90}$) corresponding to 90% of accumulation in volume-based cumulative distribution was 1.47 μm, and the particle diameter ($D_{100}$) corresponding to 100% of accumulation in volume-based cumulative distribution was 3.27 μm. The cohesion $D_{50}/D_{SEM}$ was 3.29. The cohesion $D_{50}/D_{SEM}$ of this silver particle dispersing solution was increased by 1.06 in comparison with the cohesion $D_{50}/D_{SEM}$ (2.23) of the above-described silver particles before kneading.

The initial dischargability of the silver particle dispersing solution was confirmed by the same method as that in Example 1. As a result, it was confirmed that the silver particle dispersing solution was linearly discharged without the stoppage thereof. The precipitation after 3 days at room temperature and the dischargability after 3 days at room temperature were confirmed by the same methods as those in Example 1. As a result, it was confirmed that silver particles were precipitated so as to form a clear boundary, but the silver particle dispersing solution was linearly discharged without the stoppage thereof when it was discharged. Moreover, the precipitation after freezing for 3 days and the dischargability after freezing for 3 days were confirmed by the same methods as those in Example 1. As a result, it was confirmed that silver particles were not precipitated and that the silver particle dispersing solution was linearly discharged without the stoppage thereof when it was discharged.

Example 4

There was prepared a silver powder (AG2-8F produced by DOWA ELECTRONICS MATERIALS CO., LTD.), to the surface of which stearic acid was adhered as a fatty acid. The average primary particle diameter ($D_{SEM}$) (based on the SEM image) of the silver particles was calculated by the same method as that in Example 1. As a result, the average primary particle diameter ($D_{SEM}$) was 0.30 μm. The volume-based cumulative distribution of the silver powder was obtained by the same method as that in Example 1. As a result, the particle diameter ($D_{10}$) corresponding to 10% of accumulation in volume-based cumulative distribution was 0.29 μm, and the particle diameter ($D_{50}$) corresponding to 50% of accumulation in volume-based cumulative distribution was 0.79 μm. The particle diameter ($D_{90}$) corresponding to 90% of accumulation in volume-based cumulative distribution was 1.35 μm, and the particle diameter ($D_{100}$) corresponding to 100% of accumulation in volume-based cumulative distribution was 2.75 μm, so that the cohesion $D_{50}/D_{SEM}$ was 2.63.

There was obtained a slurry by adding 120 g (29.8% by weight) of the above-described silver powder and 2.4 g (0.6% by weight) of a dispersing agent (PLYSURF A212C produced by DKS Co., Ltd.) to 280 g (69.6% by weight) of a solvent of dodecanol and isopropyl alcohol (IPA) (dodecanol (% by weight):IPA (% by weight)=9:1). The slurry was caused to pass through a filter having a mesh of 1 μm by applying a pressure of 0.05 MPa thereto while applying ultrasonic waves thereto at an ultrasonic wave output of 100 W by means of an ultrasonic dispersion filtering device (FUS-1 type produced by NIHONSEIKI KAISHA LTD.). Thus, a silver particle dispersing solution containing dispersed silver particles was obtained.

With respect to the silver particle dispersing solution thus obtained, by the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.26 μm. The particle diameter ($D_{10}$) corresponding to 10% of accumulation in volume-based cumulative distribution was 0.31 μm, and the particle diameter ($D_{50}$) corresponding to 50% of accumulation in volume-based cumulative distribution was 0.79 μm. The particle diameter ($D_{90}$) corresponding to 90% of accumulation in volume-based cumulative distribution was 1.39 μm, and the particle diameter ($D_{100}$) corresponding to 100% of accumulation in volume-based cumulative distribution was 3.27 μm. The cohesion $D_{50}/D_{SEM}$ was 3.03. The cohesion $D_{50}/D_{SEM}$ of this silver particle dispersing solution was increased by 0.40 in comparison with the cohesion $D_{50}/D_{SEM}$ (2.63) of the above-described silver particles before kneading.

The initial dischargability of the silver particle dispersing solution was confirmed by the same method as that in Example 1. As a result, it was confirmed that the silver particle dispersing solution was linearly discharged without the stoppage thereof. The precipitation after 3 days at room temperature and the dischargability after 3 days at room temperature were confirmed by the same methods as those in Example 1. As a result, it was confirmed that silver particles were precipitated so as to form a clear boundary, but the silver particle dispersing solution was linearly discharged without the stoppage thereof when it was discharged. Moreover, the precipitation after freezing for 3 days and the dischargability after freezing for 3 days were confirmed by the same methods as those in Example 1. As a result, it was confirmed that silver particles were not precipitated and that the silver particle dispersing solution was linearly discharged without the stoppage thereof when it was discharged.

Example 5

A silver particle dispersing solution containing dispersed silver particles was obtained by adding 120 g (29.8% by weight) of the same silver powder as that in Example 4 and 2.4 g (0.6% by weight) of a dispersing agent (PLYSURF A212C produced by DKS Co., Ltd.) to 280 g (69.6% by weight) of butyl carbitol (BC) as a solvent.

With respect to the silver particle dispersing solution thus obtained, by the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.27 μm. The particle diameter ($D_{10}$) corresponding to 10% of accumulation in volume-based cumulative distribution was 0.33 μm, and the particle diameter ($D_{50}$) corresponding to 50% of accumulation in volume-based cumulative distribution was 0.82 μm. The particle diameter ($D_{90}$) corresponding to 90% of accumulation in volume-based cumulative distribution was 1.43 μm, and the particle diameter ($D_{100}$) corresponding to 100% of accumulation in volume-based cumulative distribution was 3.27 μm. The cohesion $D_{50}/D_{SEM}$ was 3.04. The cohesion $D_{50}/D_{SEM}$ of this silver particle dispersing solution was increased by 0.41 in comparison with the cohesion $D_{50}/D_{SEM}$ (2.63) of the above-described silver particles before kneading.

The initial dischargability of the silver particle dispersing solution was confirmed by the same method as that in Example 1. As a result, the silver particle dispersing solution was obliquely discharged, and the bleed of the solution appeared around the nozzle of the printer, although the stoppage thereof was not caused. The precipitation after 3 days at room temperature and the dischargability after 3 days at room temperature were confirmed by the same methods as those in Example 1. As a result, it was confirmed that silver particles were precipitated so as to form a clear boundary, but the silver particle dispersing solution was linearly discharged without the stoppage thereof when it was discharged.

Example 6

A silver particle dispersing solution containing dispersed silver particles was obtained by adding 120 g (29.8% by weight) of the same silver powder as that in Example 4 and 2.4 g (0.6% by weight) of a dispersing agent (PLYSURF A212C produced by DKS Co., Ltd.) to 280 g (69.6% by weight) of butyl carbitol acetate (BCA) as a solvent.

With respect to the silver particle dispersing solution thus obtained, by the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.28 μm. The particle diameter ($D_{10}$) corresponding to 10% of accumulation in volume-based cumulative distribution was 0.35 μm, and the particle diameter ($D_{50}$) corresponding to 50% of accumulation in volume-based cumulative distribution was 0.83 μm. The particle diameter ($D_{90}$) corresponding to 90% of accumulation in volume-based cumulative distribution was 1.41 μm, and the particle diameter ($D_{100}$) corresponding to 100% of accumulation in volume-based cumulative distribution was 3.27 μm. The cohesion $D_{50}/D_{SEM}$ was 2.98. The cohesion $D_{50}/D_{SEM}$ of this silver particle dispersing solution was increased by 0.35 in comparison with the cohesion $D_{50}/D_{SEM}$ (2.63) of the above-described silver particles before kneading.

The initial dischargability of the silver particle dispersing solution was confirmed by the same method as that in Example 1. As a result, the silver particle dispersing solution was obliquely discharged, and the bleed of the solution appeared around the nozzle of the printer, although the stoppage thereof was not caused. The precipitation after 3 days at room temperature and the dischargability after 3 days at room temperature were confirmed by the same methods as those in Example 1. As a result, it was confirmed that silver particles were precipitated so as to form a clear boundary, but the silver particle dispersing solution was linearly discharged without the stoppage thereof when it was discharged.

Example 7

A silver particle dispersing solution containing dispersed silver particles was obtained by adding 120 g (29.8% by weight) of the same silver powder as that in Example 3 and 2.4 g (0.6% by weight) of a dispersing agent (PLYSURF A212C produced by DKS Co., Ltd.) to 280 g (69.6% by weight) of 2-ethyl hexanol as a solvent.

With respect to the silver particle dispersing solution thus obtained, by the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.30 μm. The particle diameter ($D_{10}$) corresponding to 10% of accumulation in volume-based cumulative distribution was 0.28 μm, and the particle diameter ($D_{50}$) corresponding to 50% of accumulation in volume-based cumulative distribution was 0.71 μm. The particle diameter ($D_{90}$) corresponding to 90% of accumulation in volume-based cumulative distribution was 1.34 μm, and the particle diameter ($D_{100}$) corresponding to 100% of accumulation in volume-based cumulative distribution was 2.75 μm. The cohesion $D_{50}/D_{SEM}$ was 2.38. The cohesion $D_{50}/D_{SEM}$ of this silver particle dispersing solution was increased by 0.15 in comparison with the cohesion $D_{50}/D_{SEM}$ (2.63) of the above-described silver particles before kneading.

The initial dischargability of the silver particle dispersing solution was confirmed by the same method as that in Example 1. As a result, the silver particle dispersing solution was obliquely discharged, and the bleed of the solution appeared around the nozzle of the printer, although the stoppage thereof was not caused. The precipitation after 3 days at room temperature and the dischargability after 3 days at room temperature were confirmed by the same methods as those in Example 1. As a result, it was confirmed that silver particles were precipitated so as to form a clear boundary, but the silver particle dispersing solution was linearly discharged without the stoppage thereof when it was discharged.

Example 8

There was prepared a silver powder (AG2-133FHD produced by DOWA ELECTRONICS MATERIALS CO., LTD.), to the surface of which palmitic acid was adhered as a fatty acid. The average primary particle diameter ($D_{SEM}$) (based on the SEM image) of the silver particles was calculated by the same method as that in Example 1. As a result, the average primary particle diameter ($D_{SEM}$) was 0.24 µm. The volume-based cumulative distribution of the silver powder was obtained by the same method as that in Example 1. As a result, the particle diameter ($D_{10}$) corresponding to 10% of accumulation in volume-based cumulative distribution was 0.19 µm, and the particle diameter ($D_{50}$) corresponding to 50% of accumulation in volume-based cumulative distribution was 0.54 µm. The particle diameter ($D_{90}$) corresponding to 90% of accumulation in volume-based cumulative distribution was 1.12 µm, and the particle diameter ($D_{100}$) corresponding to 100% of accumulation in volume-based cumulative distribution was 2.75 µm, so that the cohesion $D_{50}/D_{SEM}$ was 2.23.

A silver particle dispersing solution containing dispersed silver particles was obtained by adding 120 g (29.8% by weight) of the above-described silver powder and 2.4 g (0.6% by weight) of a dispersing agent (Disper BYK-111 produced by BYK-Chemie Japan Co., Ltd.) to 280 g (69.6% by weight) of butyl carbitol (BC) as a solvent.

With respect to the silver particle dispersing solution thus obtained, by the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.23 µm. The particle diameter ($D_{10}$) corresponding to 10% of accumulation in volume-based cumulative distribution was 0.18 µm, and the particle diameter ($D_{50}$) corresponding to 50% of accumulation in volume-based cumulative distribution was 0.43 µm. The particle diameter ($D_{90}$) corresponding to 90% of accumulation in volume-based cumulative distribution was 0.90 µm, and the particle diameter ($D_{100}$) corresponding to 100% of accumulation in volume-based cumulative distribution was 1.95 µm. The cohesion $D_{50}/D_{SEM}$ was 1.87. The cohesion $D_{50}/D_{SEM}$ of this silver particle dispersing solution was decreased by 0.28 in comparison with the cohesion $D_{50}/D_{SEM}$ (2.23) of the above-described silver particles before kneading, so that the dispersability of the silver powder was good in comparison with that of the silver powder, to which the fatty acid having the carbon number of 18 was adhered, as Examples 1 to 18.

The initial dischargability of the silver particle dispersing solution was confirmed by the same method as that in Example 1. As a result, it was confirmed that the silver particle dispersing solution was linearly discharged without the stoppage thereof. The precipitation after 3 days at room temperature and the dischargability after 3 days at room temperature were confirmed by the same methods as those in Example 1. As a result, silver particles were precipitated so as to form a clear boundary. The silver particle dispersing solution was obliquely discharged at several places, and the bleed of the solution appeared around the nozzle of the printer. Moreover, the precipitation after freezing for 3 days and the dischargability after freezing for 3 days were confirmed by the same methods as those in Example 1. As a result, it was confirmed that silver particles were not precipitated and that the silver particle dispersing solution was linearly discharged without the stoppage thereof when it was discharged.

Example 9

There was prepared a silver powder (AG2-108FHD produced by DOWA ELECTRONICS MATERIALS CO., LTD.), to the surface of which octanoic acid was adhered as a fatty acid. The average primary particle diameter ($D_{SEM}$) (based on the SEM image) of the silver particles was calculated by the same method as that in Example 1. As a result, the average primary particle diameter ($D_{SEM}$) was 0.23 µm. The volume-based cumulative distribution of the silver powder was obtained by the same method as that in Example 1. As a result, the particle diameter ($D_{10}$) corresponding to 10% of accumulation in volume-based cumulative distribution was 0.19 µm, and the particle diameter ($D_{50}$) corresponding to 50% of accumulation in volume-based cumulative distribution was 0.52 µm. The particle diameter ($D_{90}$) corresponding to 90% of accumulation in volume-based cumulative distribution was 1.05 µm, and the particle diameter ($D_{100}$) corresponding to 100% of accumulation in volume-based cumulative distribution was 2.31 µm, so that the cohesion $D_{50}/D_{SEM}$ was 2.26.

A silver particle dispersing solution containing dispersed silver particles was obtained by adding 120 g (29.8% by weight) of the above-described silver powder and 2.4 g (0.6% by weight) of a dispersing agent (PLYSURF A212C produced by DKS Co., Ltd.) to 280 g (69.6% by weight) of a solvent of dodecanol and isopropyl alcohol (IPA) (dodecanol (% by weight):IPA (% by weight)=9:1).

With respect to the silver particle dispersing solution thus obtained, by the same methods as those in Example 1, there was calculated the average primary particle diameter ($D_{SEM}$) of the silver particles in the silver particle dispersing solution, and there were measured a particle diameter ($D_{10}$) corresponding to 10% of accumulation in volume-based cumulative distribution, a particle diameter ($D_{50}$) corresponding to 50% of accumulation in volume-based cumulative distribution, a particle diameter ($D_{90}$) corresponding to 90% of accumulation in volume-based cumulative distribution, and a particle diameter ($D_{100}$) corresponding to 100% of accumulation in volume-based cumulative distribution. As a result, the average primary particle diameter ($D_{SEM}$) was 0.23 µm. The particle diameter ($D_{10}$) corresponding to 10% of accumulation in volume-based cumulative distribution was 0.19 µm, and the particle diameter ($D_{50}$) corresponding to 50% of accumulation in volume-based cumulative distribution was 0.45 µm. The particle diameter ($D_{90}$) corresponding to 90% of accumulation in volume-based cumulative distribution was 1.00 µm, and the particle diameter ($D_{100}$) corresponding to 100% of accumulation in volume-based cumulative distribution was 2.31 µm. The cohesion $D_{50}/D_{SEM}$ was 1.97. The cohesion $D_{50}/D_{SEM}$ of this silver particle dispersing solution was decreased by 0.29 in comparison with the cohesion $D_{50}/D_{SEM}$ (2.26) of the above-described silver particles before kneading, so that the dispersability of the silver powder was good in comparison with that of the silver powder, to which the fatty acid having the carbon number of 18 was adhered, as Examples 1 to 18.

The initial dischargability of the silver particle dispersing solution was confirmed by the same method as that in Example 1. As a result, it was confirmed that the silver particle dispersing solution was linearly discharged without the stoppage thereof. The precipitation after 3 days at room temperature and the dischargability after 3 days at room temperature were confirmed by the same methods as those in Example 1. As a result, silver particles were precipitated so as to form a clear boundary. The silver particle dispersing solution was obliquely discharged at several places, and the bleed of the solution appeared around the nozzle of the printer. Moreover, the precipitation after freezing for 3 days and the dischargability after freezing for 3 days were confirmed by the same methods as those in Example 1. As a result, it was confirmed that silver particles were not precipitated and that the silver particle dispersing solution was linearly discharged without the stoppage thereof when it was discharged.

Comparative Example

A silver particle dispersing solution containing dispersed silver particles was obtained by adding 120 g (29.8% by weight) of the same silver powder as that in Example 1 and 2.4 g (0.6% by weight) of a dispersing agent (PLYSURF A212C produced by DKS Co., Ltd.) to 280 g (69.6% by weight) of isopropyl alcohol (IPA) as a solvent.

With respect to the silver particle dispersing solution thus obtained, the initial dischargability of the silver particle dispersing solution was confirmed by the same method as that in Example 1. As a result, the silver particle dispersing solution was intermittently discharged with the stoppage thereof. The precipitation after 3 days at room temperature and the dischargability after 3 days at room temperature were confirmed by the same methods as those in Example 1. As a result, silver particles were precipitated, and the supernatant liquid was transparent. The silver particle dispersing solution was intermittently discharged with the stoppage thereof when it was discharged.

These results are shown in Tables 1-3. Furthermore, with respect to the evaluation of dischargability in Table 3, "○" is shown if the silver particle dispersing solution was linearly discharged without the stoppage thereof, "Δ" is shown if the silver particle dispersing solution was obliquely discharged and the bleed of the solution appeared around the nozzle of the printer, although the stoppage thereof was not caused, and "×" is shown if the silver particle dispersing solution was intermittently discharged with the stoppage thereof. With the evaluation of precipitation in table 3, "⊚" is shown if the silver particles were not precipitated, "○" is shown if a very small amount of silver particles were precipitated, "Δ" is shown if the silver particles were precipitated so as to form a clear boundary, and "×" is shown if the silver particles were precipitated and the supernatant liquid was transparent.

TABLE 1

| | Silver Powder (µm) | | | | | | | Mesh |
|---|---|---|---|---|---|---|---|---|
| | $D_{SEM}$ | $D_{10}$ | $D_{50}$ | $D_{90}$ | $D_{100}$ | $D_{50}/D_{SEM}$ | Solvent | (µm) |
| Ex. 1 | 0.21 | 0.18 | 0.57 | 1.12 | 3.27 | 2.70 | Dodecanol IPA | 1 |
| Ex. 2 | 0.21 | 0.18 | 0.59 | 1.22 | 3.89 | 2.79 | Dodecanol IPA | 0.6 |
| Ex. 3 | 0.26 | 0.21 | 0.58 | 1.10 | 3.27 | 2.23 | Dodecanol IPA | 1 |
| Ex. 4 | 0.30 | 0.29 | 0.79 | 1.35 | 2.75 | 2.63 | Dodecanol IPA | 1 |
| Ex. 5 | 0.30 | 0.29 | 0.79 | 1.35 | 2.75 | 2.63 | BC | — |
| Ex. 6 | 0.30 | 0.29 | 0.79 | 1.35 | 2.75 | 2.63 | BCA | — |
| Ex. 7 | 0.26 | 0.21 | 0.58 | 1.10 | 3.27 | 2.23 | 2-ethyl hexanol | — |
| Ex. 8 | 0.24 | 0.19 | 0.54 | 1.12 | 2.75 | 2.23 | BC | — |
| Ex. 9 | 0.23 | 0.19 | 0.52 | 1.05 | 2.31 | 2.26 | Dodecanol IPA | — |
| Comp. | 0.21 | 0.18 | 0.57 | 1.12 | 3.27 | 2.70 | IPA | — |

TABLE 2

| | Silver Particle Dispersing Solution | | | | | | | | |
|---|---|---|---|---|---|---|---|---|---|
| | Viscosity (mPa·s) | Surface Tension (mN/m) | Silver Powder (µm) | | | | | | Difference of $D_{50}/D_{SEM}$ |
| | | | $D_{SEM}$ | $D_{10}$ | $D_{50}$ | $D_{90}$ | $D_{100}$ | $D_{50}/D_{SEM}$ | |
| Ex. 1 | 12.4 | 26 | 0.19 | 0.19 | 0.50 | 0.97 | 1.95 | 2.62 | −0.08 |
| Ex. 2 | — | 26.7 | 0.20 | 0.25 | 0.68 | 1.25 | 2.75 | 3.38 | 0.59 |
| Ex. 3 | — | 27.7 | 0.26 | 0.35 | 0.86 | 1.47 | 3.27 | 3.29 | 1.06 |
| Ex. 4 | — | — | 0.26 | 0.31 | 0.79 | 1.39 | 3.27 | 3.03 | 0.40 |
| Ex. 5 | — | — | 0.27 | 0.33 | 0.82 | 1.43 | 3.27 | 3.04 | 0.41 |
| Ex. 6 | — | — | 0.28 | 0.35 | 0.83 | 1.41 | 3.27 | 2.98 | 0.35 |
| Ex. 7 | — | — | 0.30 | 0.28 | 0.71 | 1.34 | 2.75 | 2.38 | 0.15 |
| Ex. 8 | — | — | 0.23 | 0.18 | 0.43 | 0.90 | 1.95 | 1.87 | −0.28 |
| Ex. 9 | — | — | 0.23 | 0.19 | 0.45 | 1.00 | 2.31 | 1.97 | −0.29 |
| Comp | — | — | — | — | — | — | — | — | — |

TABLE 3

| | Initial | After 3 days at room temp. | | After Freezing for 3 days | |
|---|---|---|---|---|---|
| | Dischargability | Precipitation | Dischargability | Precipitation | Dischargability |
| Ex. 1 | ○ | ○ | ○ | ◎ | ○ |
| Ex. 2 | ○ | ○ | ○ | ◎ | ○ |
| Ex. 3 | ○ | Δ | ○ | ◎ | ○ |
| Ex. 4 | ○ | Δ | ○ | ◎ | ○ |
| Ex. 5 | Δ | Δ | ○ | — | — |
| Ex. 6 | Δ | Δ | ○ | — | — |
| Ex. 7 | Δ | Δ | ○ | — | — |
| Ex. 8 | ○ | Δ | Δ | ◎ | ○ |
| Ex. 9 | ○ | Δ | Δ | ◎ | ○ |
| Comp. | X | X | X | — | — |

INDUSTRIAL APPLICABILITY

The silver particle dispersing solution according to the present invention can be applied on a substrate by means of an ink-jet printer or the like to be heated or irradiated with light to be cured to be used for forming conductive films of electrodes and circuits of electronic parts, such as CIS (thin film) or HIT (single-crystalline hybrid type) PV (solar cell), or electronic parts using a flexible substrate of a digital signage or a wearable device.

The invention claimed is:

1. A silver particle dispersing solution consisting of:
   a silver powder of silver particles;
   a solvent; and
   a dispersing agent
   wherein the silver powder having an average primary particle diameter ($D_{SEM}$) of 0.15 to 0.5 μm,
   wherein the ratio ($D_{50}/D_{SEM}$) of a particle diameter ($D_{50}$), which corresponds to 50% of accumulation in volume-based cumulative distribution of the silver powder, to the average primary particle diameter ($D_{SEM}$) is not less than 1.7,
   wherein a fatty acid is adhered to the surface of said silver powder, and
   wherein the solvent contains an organic compound having a carbon number of 6 to 20.

2. A silver particle dispersing solution as set forth in claim 1, wherein said solvent is an organic solvent which freezes at a temperature of −80° C. to −20° C.

3. A silver particle dispersing solution as set forth in claim 1, wherein said organic compound having the carbon number of 6 to 20 is a monohydric higher alcohol having a carbon number of 6 to 12, butyl carbitol or butyl carbitol acetate.

4. A silver particle dispersing solution as set forth in claim 3, wherein said organic compound having the carbon number of 6 to 20 is the monohydric higher alcohol having the carbon number of 6 to 12, and said solvent contains a lower alcohol or ketone, which has a carbon number of not larger than 5.

5. A silver particle dispersing solution as set forth in claim 4, wherein said monohydric higher alcohol having the carbon number of 6 to 12 is dodecanol.

6. A silver particle dispersing solution as set forth in claim 1, wherein said fatty acid has a hydroxyl group.

7. A silver particle dispersing solution as set forth in claim 6, wherein said fatty acid having the hydroxyl group is ricinoleic acid.

8. A silver particle dispersing solution as set forth in claim 1, wherein the content of said silver powder in said silver particle dispersing solution is 10 to 45% by weight.

* * * * *